Dec. 4, 1962

M. KNOBEL 3,066,751

WEIGHING APPARATUS

Filed April 29, 1958

INVENTOR.
BY Max Knobel
Robert R. Churchill
ATTORNEY

Dec. 4, 1962

M. KNOBEL 3,066,751

WEIGHING APPARATUS

Filed April 29, 1958

INVENTOR.
Max Knobel
BY
Robert R. Churchill
ATTORNEY

United States Patent Office 3,066,751
Patented Dec. 4, 1962

3,066,751
WEIGHING APPARATUS
Max Knobel, Boston, Mass., assignor to Pneumatic Scale Corporation, Limited, a corporation of Massachusetts
Filed Apr. 29, 1958, Ser. No. 731,660
14 Claims. (Cl. 177—202)

This invention relates to weighing apparatus.

The invention has for an object to provide novel and improved weighing apparatus adapted for rapid and accurate weighing performance and which is characterized by novel servo mechanism adapted to apply a counterforce to the weighing element proportionate to the weight of a load placed thereon whereby the deflection of the weighing element during the weighing operation is reduced to a minimum.

The invention has for a further object to provide a novel and improved weighing apparatus of the character specified adapted to quickly and accurately check weigh filled packages and to indicate any deviation over or under a predetermined weight of a filled package being check weighed.

A still further object of the invention is to provide novel and improved check weighing apparatus of the character specified having provision for determining the weight of successive loads being check weighed upon minute deflection of the weighing element, and wherein a counterforce proportionate to the weight or deviation in weight from a predetermined correct weight is applied to the weighing element in response to said minute deflection whereby to reduce to a minimum the movement of the weighing element during the check weighing operation.

With these general objects in view and such others as may hereinafter appear, the invention consists in the weighing apparatus and in the various structures, arrangements and combinations of parts hereinafter described and particularly defined in the claims at the end of this specification.

In the drawings illustrating the preferred embodiment of the invention:

FIG. 4 is a detail view partly in cross section illustrating pneumatic control mechanism to be referred to.

Figure 1:
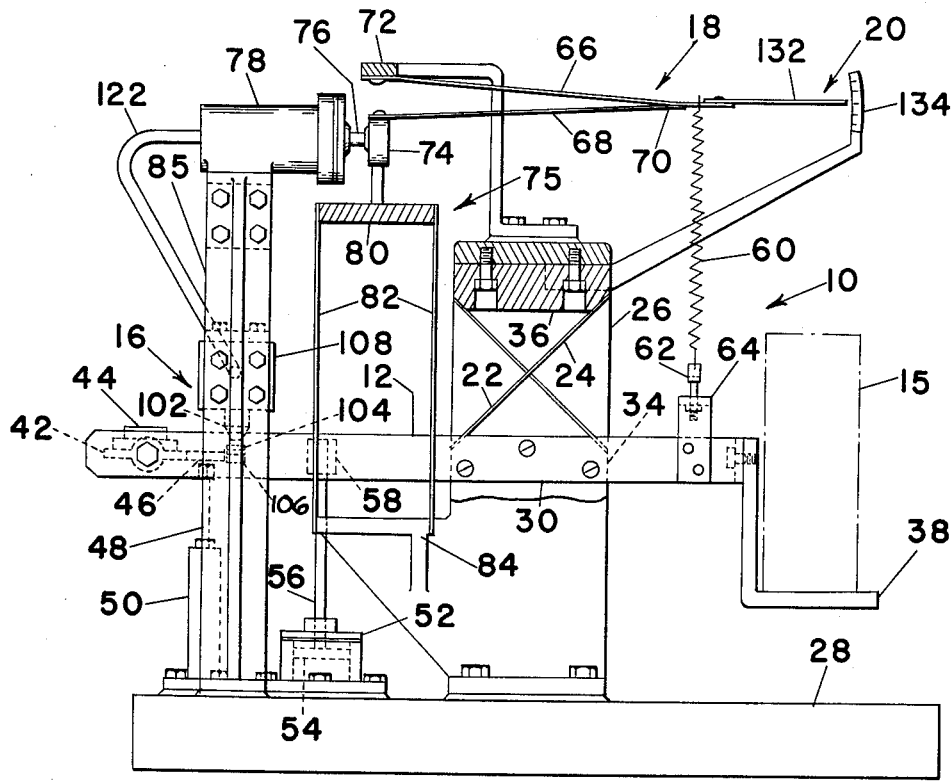
FIG. 1 is a front elevation of check weighing apparatus embodying the present invention.
Figure 2:
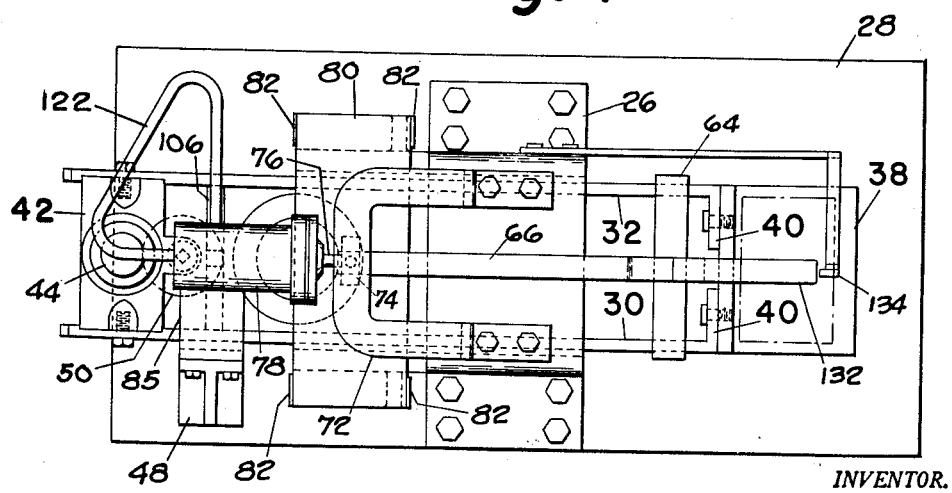
FIG. 2 is a plan view of the apparatus shown in FIG. 1.
Figure 3:
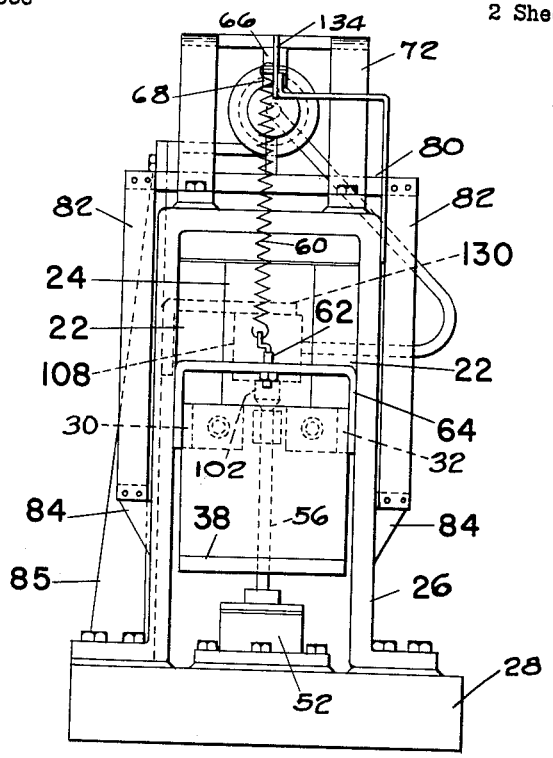
FIG. 3 is an end view of the check weighing apparatus.

In general the present invention contemplates novel weighing apparatus characterized by novel servo mechanism responsive to minute deflection of the weighing element under the influence of a load and adapted to apply a counterforce proportionate to the weight of the load during the weighing operation whereby the weight of the load may be rapidly and accurately determined with a minimum deflection of the weighing element.

The invention is herein illustrated as embodied in check weighing mechanism wherein provision is made for determining the weight of successive loads being check weighed with relation to a predetermined desired weight and for rapidly and accurately indicating such weights. The present check weighing mechanism preferably embodies a deflectable weighing element, herein shown as a balance beam wherein during the check weighing operation the deflection of the balance beam in performing the weighing operation may be measured in thousandths of an inch. In the illustrated embodiment of the invention the balance beam is counterweighted to support a major portion of the weight of the load placed on the weighing end thereof, and the weighing end of the balance beam is further supported by resilient means forming in effect a variable counterforce applying unit wherein the amount of the counterforce applied to the beam is determined by and actuated through pneumatic control mechanism responsive to the relatively minute deflection of the balance beam under the influence of the weight of the load being check weighed, thereby reducing to a minimum the deflection of the beam and substantially increasing the speed of the weighing operation.

In the preferred embodiment of the invention the control mechanism includes a pneumatically operated unit designed so that a small fractional movement of the weighing element causes an increase in the pressure in the pneumatic unit to actuate the counterforce applying means, the latter being designed to substantially amplify the relatively small movement of the weighing element to apply the counterforce thereto and to also cooperate with weight indicating means. In effect, the present weighing structure comprises a rebalancing type of check weighing mechanism provided with novel servo mechanism wherein a filled package placed on the weighing end of the beam effects deflection of the beam, the magnitude of such deflection being detected by the pneumatic control unit, and the counterforce applying unit effecting a proportional correcting action. As a result, any movement of the balance beam is reduced to a minimum, and rapid and accurate check weighing operations may be performed.

Referring now to the drawings, in general the present check weighing apparatus indicated generally at 10 includes: a deflectable weighing element, herein shown as a counterweighted balance beam 12; a pneumatically operated control unit indicated generally at 16 responsive to the deflection of the balance beam under the influence of a filled package 15 placed on the weighing end thereof; and a resilient variable counterforce applying unit 18 operatively connected to the weighing end of the balance beam 12 and actuated by the pneumatic control unit 16 in a manner such as to apply a counterforce to the weighing end of the beam proportionate to the weight or deviation from a predetermined weight of the package 15 being check weighed. The movement of the counterforce applying unit 18 also comprises a measure of the weight of the package and accordingly the unit 18 may cooperate with weight indicating means shown at 20.

As herein illustrated, the balance beam 12 is supported intermediate its ends by crossed straps 22, 24 suspended from a bracket 26 mounted on a base member 28. The balance beam may include two spaced and parallel arms 30, 32 comprising frame members connected intermediate their ends by a tie block 34 to which the cross straps 22, 24 are attached, the other ends of the cross straps being connected to a block 36 attached to the bracket 26. The cross straps 22, 24 may comprise flat metal straps including two relatively narrow outer straps 22 extended diagonally in one direction between the corners of the blocks 34, 36 and a single intermediate strap 24 of a width equal to the width of both straps 22 and extended diagonally at right angles to the straps 22 between the opposite corners of the blocks 34, 36.

The weighing end of the balance beam 12 is provided with a weighing platform 38 connected to right angle extensions 40 of the beam arms 30, 32, and the counterweight end of the balance beam is provided with a tie piece 42 arranged to support one or more counterweights 44 for counterbalancing the major portion of the load placed on the weighing platform 38. A central inward extension 46 from the tie piece 42 is provided for cooperation with an adjustable stop screw 48 for adjustably limiting the downward movement of the counterweight end of the beam. The adjustable screw 48 may be supported in a pedestal 50 mounted on the base member 28. A dash pot 52 also mounted on the base member 28 is provided with a piston 54 having a stem 56 connected to a tie piece 58 extended between and secured to the beam arms 30, 32 for the purpose of preventing oscillation of the balance beam during the weighing operation and for damping any vibrations thereof.

The weighing end of the balance beam 12 is further provided with a coil spring 60 connected at its upper end to the resilient counterforce applying unit 18 for supporting a relatively small portion of the weight of the filled package placed on the weighing platform. The lower end of the coil spring 60 is connected to a spring stud 62 adjustably secured in a tie strap 64 connected between the balance beam arms 30, 32 as shown.

The resilient counterforce applying unit 18 comprises a pair of substantially horizontally extended upper and lower flat spring arms 66, 68 of equal length connected together at one end as indicated at 70 providing in effect a cantilever spring beam structure. The upper spring arm 66 is secured at its other end to a stationary support 72 attached to and extended from the upper end of the bracket 26. The lower spring arm 68 is connected at its other end to a movable connecting member 74 supported at the upper end of a parallel motion support indicated generally at 75. The member 74 is preferably formed integrally with the plunger 76 of an air cylinder 78 forming a part of the pneumatic control mechanism. The parallel support 75 includes an upper block 80 from which the member 74 extends, and four parallel leaf springs 82 connecting the block 80 to lateral extensions 84 of the bracket 26. As herein shown, the air cylinder 78 is supported at the upper end of a bracket 85 attached to the base member 28 as shown. In operation when the plunger 76 is urged outwardly, or to the right, viewing FIG. 1, a relatively short distance in response to the pneumatically operated control unit 16, the lower spring arm 68 will be moved longitudinally to effect upward bending or rocking of the upper spring arm 66, and particularly the connected end 70 of the arms, a relatively greater and proportionate distance. In this manner it may be observed that a relatively small movement of the plunger 76 is substantially amplified through the movement of spring arms 66, 68, and a relatively large movement is produced at the connected end of the arms. As shown in detail in FIG. 4, the plunger 76 is formed integrally with the member 74 and is normally maintained in its retracted position by a coil spring 86 interposed between the head 88 of the plunger and the cylinder cap 90. A washer 91 may be provided between the cap and the cylinder as shown.

The pneumatically operated control unit 16 for measuring the relatively small deflection of the balance beam 12 under the influence of a filled package placed on the weighing platform is constructed so that a rather large pressure change occurs upon deflection of the balance beam through a minute distance, and the deflection is arranged to vary the pressure in the pneumatically operated unit by an amount proportionate to the deflection, an overweight load effecting a relatively large increase in pressure, and an underweight load increasing the pressure a lesser amount, and in accordance with the present invention such different pressures are translated into movement to actuate the counterforce applying unit 18 whereby to apply a counterforce to the weighing end of the balance beam in an amount proportional to the weight of the package.

Figure 4:
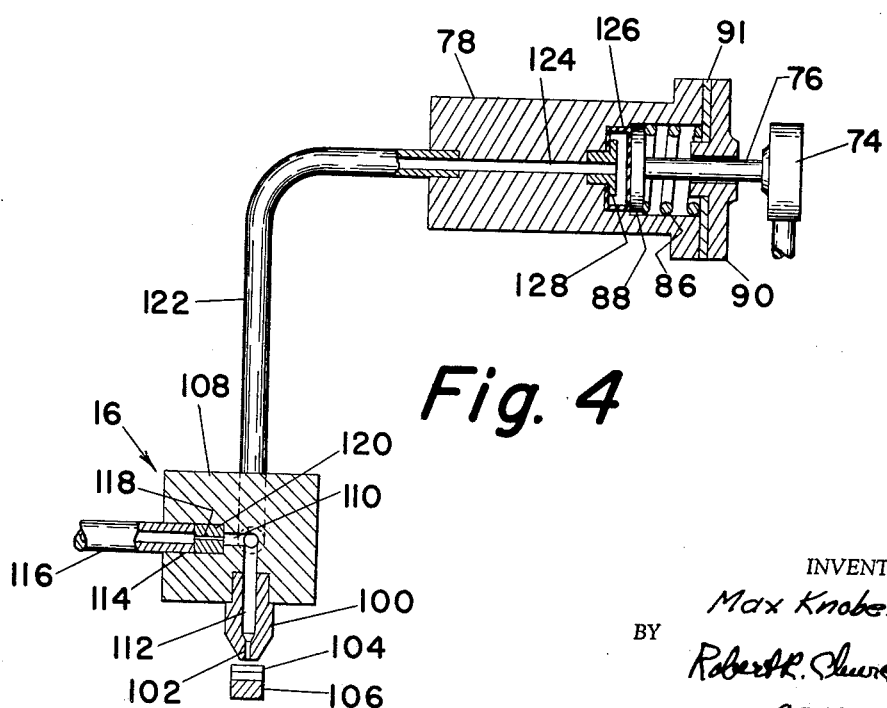

As shown in FIG. 4, the control unit 16 includes a jet member 100 having a small discharge orifice 102 through which air under substantial pressure is discharged and which is arranged to cooperate with a valve member 104 carried by a tie piece 106 extended between and connected to the arms 30, 32 of the balance beam. The jet member 100 is carried by a block 108 having a relatively small pressure chamber 110 communicating with the orifice 102 through a passageway 112. The inlet 114 may be supplied with a regulated source of compressed air through a pipe 116 and a restricted throat portion 118 formed in a tubular insert 120, the restricted throat being arranged to offer a substantial resistance to the flow of air therethrough. The pressure chamber 110 is also connected by a pipe 122 to the air cylinder 78. The pipe 122 communicates with a passageway 124 in the cylinder leading to an expansible diaphragm 126 provided at the bottom of the cylinder chamber and secured in airtight relation by a flanged insert 128. As illustrated, the face of the diaphragm is arranged to bear against the face of the plunger head 88. The block 108 may be supported by an angle bar 130 attached to the bracket 85 as shown.

In operation the balance beam 12 may be adjusted to initially dispose the valve member 104 spaced a relatively small distance from the discharge orifice 102, and upon minute deflection of the balance beam under the influence of the load, the valve is moved toward the discharge orifice a minute amount, thereby impeding the flow of air through the orifice and effecting a substantial pressure rise in the chamber 110 between the discharge orifice 102 and the restricted throat portion 118. The increase in pressure transmitted through pipe 122 effects expansion of the diaphragm 126 and outward movement of the plunger 76 to cause upward bending movement of the resilient unit 18, thus applying a counterforce to the weighing end of the beam 12 through the connecting spring 60. The counterforce thus applied to the weighing end of the beam may be proportionate to the weight of the load to reduce to a minimum the deflecting movement of the balance beam which results in rapid weighing performance. In order to visibly indicate the weight or deviation from a predetermined weight of the load, the counterforce applying unit 18 is arranged to cooperate with the weight indicating means 20, herein shown as including an extension 132 of the upper arm 66 which comprises a pointer for cooperation with a graduated dial 134, as shown in FIG. 1. It will be apparent that the relatively small longitudinal movement of the arm 68 effects a relatively large proportional movement of the outer end of the unit 18.

From the above description it will be seen that in the operation of the check weighing apparatus, when a load exceeding the counterweighted balancing point of the balance beam 12 is placed on the weighing platform, minute movement of the beam will cause a counterforce to be applied to the weighing end of the beam in an amount proportionate to the weight of that portion of the load exceeding a predetermined weight, thus reducing the deflection of the beam to a minimum and providing in effect a pneumatically and mechanically operated rebalancing servo mechanism capable of rapid and accurate weighing performance. Thus, deflection of the balance beam beyond the balancing point is detected by the pneumatically operated unit and the counterforce applying unit responsive thereto is caused to apply a proportionate correcting action to reduce the deflecting movement to a minimum. It will be observed that the dash pot serves to damp the movement of the beam to prevent teetering or oscillation thereof and to permit the counterforce to be applied progressively in accordance with the weight of the load.

In the operation of the illustrated check weighing apparatus embodying rebalancing servo-weighing mechanism, assuming that a filled package of a desired predetermined weight of 16 ounces is to be check weighed, a counterweight 44 of 14 ounces may be used to counterbalance a major portion of the filled package, and the coil spring 60 connected to the weighing end of the balance beam 12 may be arranged to support an additional one ounce of the weight of the package. When a filled package of more than 15 ounces in weight, that is, more than the balance position of the counterweighted beam is placed on the weighing platform 38, the beam will be deflected downwardly a minute amount and the counterweight end of the beam will be rocked upwardly a corresponding amount to effect an increase in pressure in the pneumatic control unit 16. The increase in pressure will cause the plunger 76 to be moved outwardly against the action of the spring 88 a relatively small distance to effect upward movement of the outer end of the counterforce applying unit 18 a relatively greater distance to apply through the coil spring 60 a counterforce in a rebalancing direction proportionate to that portion of the weight of the package exceeding the balance point of 15 ounces. As a result, the deflection of the beam is held to a minimum not exceeding a few thousandths of an inch. Such movement of the counter force applying unit will be indicated on the dial which may be calibrated in fractions of an ounce from a zero or balance position of 15 ounces, which is one ounce underweight, to a 17 ounce position, which is one ounce overweight. Thus, a counterforce applied by the counterforce applying unit proportionate to one ounce over the balance point of 15 ounces would be indicated as 16 ounces comprising the correct weight on the dial 134, and counterforces proportionate to weights greater or less than such predetermined correct weight but more than the balance weight of 15 ounces would be applied to the beam and indicated on the dial in accordance with the weight or deviation in weight from the correct weight.

In practice it was found that extremely rapid weighing performance in the order of one-fifth of a second per weighing operation may be accomplished in the present apparatus with a minimum of movement of the balance beam in the order of a few thousandths of an inch. While the proportions of the illustrated elements may vary it will be understood that the various elements of the rebalancing servo-weighing mechanism are coordinated as to pressures and translated movements to provide uniform sensitivity and substantially linear response with respect to variations in weight over a wide deflection range.

It will be observed that the use of the cross straps 22, 24 for supporting the balance beam 12 provides a simple and efficient support free of bearings or knife edges and subject to unlimited use without wear. It will also be observed that the parallel motion support 75 for the connected members 74 and 68 provides a resilient frictionless support also subject to long use without wear.

It will be apparent that while the present rebalancing servo-weighing mechanism has been illustrated and described herein as embodied in check weighing apparatus, the mechanism shown herein may also be used with advantage in other types of weighing apparatuses differing from the type described above within the scope of the following claims.

It will also be understood that with respect to the movement or deflection of the weighing beam 12, wherever the terms "minute" movement or deflection of a "thousandth" or a "few thousandths" of an inch occur, such terms are also intended to include a movement or deflection of less than one thousandth of an inch.

Having thus described the invention, what is claimed is:

1. Weighing apparatus comprising a movable weighing element, control means for measuring minute deflection of the weighing element when a load in excess of a predetermined balance point less than a desired weight is applied thereto, and means responsive to said control means for applying a counterforce to said weighing element in an amount proportionate to the weight of said load in excess of said balance point whereby to reduce to a minimum deflection of the weighing element during the weighing operation, said counterforce applying means including a cantilever spring beam structure arranged to be rocked upwardly in response to said control means, and a coil spring connecting said cantilever spring structure and said weighing element.

2. Weighing apparatus comprising a deflectable weighing element, means for measuring minute deflection of the weighing element when a load in excess of a predetermined balance point less than a desired weight is applied thereto, means responsive to said measuring means for applying a counterforce to the weighing element in an amount proportionate to the weight of the load, in excess of said balance point, and means for ascertaining the extent of movement of said counterforce applying means for indicating the weight of said load, said counterforce applying means including a cantilever spring beam structure arranged to be rocked upwardly in response to said control means, and a coil spring connecting said cantilever spring structure and said weighing element.

3. Weighing apparatus comprising a deflectable weighing element, and servo mechanism for controlling the deflection of the weighing element when a load in excess of a predetermined balance point less than a desired weight is applied thereto, including pneumatically operated means for measuring minute deflection of the weighing element, and means including a cantilever spring beam structure arranged to be rocked upwardly in response to said pneumatically operated means, and a coil spring connecting said cantilever structure and said weighing element for applying a counterforce to said weighing element in an amount proportionate to the weight of the load in excess of said balance point, whereby to reduce to a minimum deflection of the weighing element during the weighing operation.

4. Weighing apparatus comprising a deflectable weighing element including a balance beam, control means for measuring minute deflection of the balance beam when a load in excess of a predetermined balance point less than a desired weight is placed on the weighing end thereof, and means including a cantilever spring beam structure arranged to be rocked upwardly in response to said control means, and a coil spring connecting said cantilever structure and said weighing element for applying a counterforce to the balance beam in an amount proportionate to the weight of said load in excess of said balance point.

5. Check weighing apparatus comprising a balance beam having a predetermined counterweight, control means for measuring minute deflection in the order of less than one-thousandth of an inch of the beam when a load to be check weighed is placed on the weighing end thereof and is in excess of the predetermined counterweight, and means including a cantilever spring beam structure arranged to be rocked upwardly in response to said control means, and a coil spring connecting said cantilever structure and said weighing element for only applying an additional counterforce to the weighing end of the beam in an amount proportionate to the deflection of the beam caused by any weight in excess of the predetermined counterweight.

6. Check weighing apparatus comprising a balance beam having a predetermined counterweight, control means for measuring minute deflection of the beam when a load to be check weighed is placed on the weighing end thereof is in excess of the predetermined counterweight, means including a cantilever spring beam structure arranged to be rocked upwardly in response to said control means, and a coil spring connecting said cantilever structure and said weighing element for only applying an additional counterforce to the weighing end of the beam in an amount proportionate to the deflection of the beam caused by any weight in excess of the predetermined counterweight, and means for ascertaining the extent of movement of said counterforce, applying means for indicating the weight or deviation in weight from a predetermined desired weight.

7. Check weighing apparatus comprising a balance beam having a predetermined counterweight, control means for measuring minute deflection of the beam when a load to be check weighed is placed on the weighing end thereof and is in excess of the predetermined counterweight, means including a cantilever spring beam structure arranged to be rocked upwardly in response to said control means, and a coil spring connecting said cantilever structure and said weighing element for only applying an additional counterforce to the weighing end of the beam in an amount proportionate to deflection of the beam caused by any weight in excess of the predetermined counterweight, and means for damping the movement of the balance beam to permit the counterforce to be applied progressively in accordance with the weight of the load.

8. Check weighing apparatus comprising a deflectable weighing element including a counterweighted balance beam having a load supporting platform, pneumatically operated control means for measuring minute deflection in the order of less than one-thousandth of an inch of the balance beam when a load is placed on said platform, and resilient counterforce applying means including a cantilever spring beam structure arranged to be rocked upwardly in response to said pneumatically operated control means and a coil spring connecting said cantilever structure to the weighing end of said balance beam adapted to apply only a counterforce in an amount proportionate to the weight of the load in excess of the counterweight, and means for ascertaining the extent of movement of said counterforce applying means for indicating the weight or deviation in weight from a predetermined desired weight.

9. Check weighing apparatus as defined in claim 8 wherein the resilient counterforce applying means comprises a pair of leaf spring arms joined together at their outer ends and connected at their inner ends to a stationary support and a movable support respectively, said movable support being operatively connected to said pneumatic control means whereby minute deflection of the balance beam effects a corresponding longitudinal thrust on one of its connected spring arms to cause an upward rocking movement of the joined ends of the spring arms through a relatively greater proportionate distance.

10. Check weighing apparatus as defined in claim 8 wherein the pneumatic control means is arranged to provide a relatively large increase in pressure upon minute movement of said balance beam, and a pneumatically operated member actuated by said increase in pressure and connected to a movable support, said resilient counterforce applying means comprising a pair of leaf spring arms joined together at their outer ends and connected at their inner ends to a stationary support and to said movable support respectively, whereby minute deflection of the balance beam effects a corresponding longitudinal push on its connected spring arm to cause an upward rocking movement of the joined ends of the spring arms through a relatively greater proportionate distance.

11. Check weighing means as defined in claim 10 wherein the weight indicating means includes a pointer comprising an extension of one of said spring arms and a graduated dial cooperating with the pointer.

12. Check weighing means as defined in claim 10 wherein the movable support includes a resilient parallel motion device.

13. Check weighing apparatus comprising a counterweighted balance beam having a weighing platform, and servo mechanism for applying a rebalancing force to the beam upon minute deflection thereof when a load to be check weighed is placed on the weighing platform and is in excess of the counterweight, said servo mechanism including pneumatically operated means for measuring minute deflection of the beam in order of less than one-thousandth of an inch, and means operatively connected to said pneumatically operated means including a cantilever spring beam structure arranged to be rocked upwardly in response to said pneumatically operated means, and a coil spring connecting said cantilever structure to said balance beam for applying said rebalancing force in an amount proportional to the weight of said load in excess of the counterweight, whereby to reduce to a minimum the deflecting movement of said beam.

14. Check weighing apparatus as defined in claim 13 which includes graduated means for ascertaining the extent of movement of said rebalancing means for indicating the weight or a deviation from a predetermined desired weight of said load.

References Cited in the file of this patent

UNITED STATES PATENTS

| | | |
|---|---|---|
| 1,878,554 | Townshend et al. | Sept. 20, 1932 |
| 1,893,205 | Hughes | Jan. 3, 1933 |
| 1,894,025 | Dennison et al. | Jan. 10, 1933 |
| 2,011,931 | Dreyer | Aug. 20, 1935 |
| 2,350,261 | Tate | May 20, 1944 |
| 2,407,513 | Pounds | Sept. 10, 1946 |
| 2,408,685 | Rosenberger | Oct. 1, 1946 |
| 2,584,949 | Weckerly | Feb. 5, 1952 |
| 2,602,660 | Shannon | July 8, 1952 |
| 2,734,736 | Payne | Feb. 14, 1956 |
| 2,739,803 | Carton | Mar. 27, 1956 |
| 2,773,685 | Aagaard | Dec. 11, 1956 |